UNITED STATES PATENT OFFICE.

FRANCIS W. COLBY AND EDWIN EVANS, OF STREATOR, ILLINOIS.

IMPROVEMENT IN COMPOSITIONS FOR ARTIFICIAL STONE.

Specification forming part of Letters Patent No. 157,312, dated December 1, 1874; application filed May 16, 1874.

*To all whom it may concern:*

Be it known that we, FRANCIS W. COLBY and EDWIN EVANS, of Streator, county of La Salle and State of Illinois, have invented a certain Compound, of which the following is a specification:

This invention relates to that class of compounds used in making artificial stone. It consists in using an aqueous saccharine solution as a solvent of lime, in combination with a soluble silicate and lime, to facilitate and expedite the formation of silicate of lime, or aluminate of lime, or both silicate and aluminate of lime, or compounds of silica, lime, and alumina, and to increase the quantity of silicate of lime or aluminate of lime, or of both, in a given mass of materials for making stone, and to render said mass more plastic, thereby improving its handling and molding qualities. We add to the aqueous saccharine solution the desired quantity of a soluble silicate, and call the combination "the combining-solvent."

Most artificial stones owe their hardness, strength, and durability principally to the compounds of silica and alumina which enter into their composition.

Lime is soluble in seven hundred parts of cold water. It is much more soluble in sirups and aqueous saccharine solutions.

When silicates in solution are added to a mortar of fat lime the lime in solution promptly combines with the silica in the silicates, forming the silicate of lime. The greater the quantity of dissolved lime the more silicate of lime will be formed. The more silicate of lime formed the harder will the mass become.

Now, when the mortar is made with a saccharine solution it contains much more dissolved lime than when made with water. Hence, more silicate of lime is formed, and the mass becomes a stone, as combination, evaporation, and crystallization progress.

Hydraulic lime contains silicate of lime as the result of calcination. When water is added more silicate of lime is formed by the transfer of soluble lime to the silica, which has not combined under the influence of heat. The silicate formed during calcination also becomes hydrated.

These hydrosilicates soon crystallize or set, hardening the mass. The hardness is increased by increasing the amount of silicate of lime. This is done by moistening the mass with the combining-solvent instead of water. Result, hard stone.

Hydraulic cements all contain various proportions of silicates of lime, aluminates of lime, free alumina, &c., their compounds varying with the intensity of the calcining heat.

All these compounds set after becoming hydrated, forming a hard insoluble compound. The hardness is intensified by increasing the amount of silicate and aluminate of lime, which is done by adding a small proportion of lime-powder to the cement, moistening the whole with the combining-solvent, and thoroughly mixing.

The combining-solvent presents lime in solution to the free silica and alumina of the cement, thus facilitating and expediting their combinations. It also dissolves lime in immediate contact with the added silicate, thus insuring a transfer of lime to the silica. The anhydrous silicates formed during calcination are at the same time hydrated.

The ultimate result of the combinations facilitated and produced by this process is a superior stone, of great hardness, strength, and durability.

Cement-paste is smoother and more plastic when a little lime and saccharine matter are added, than when made with water and cement alone. After the proper amount of sand is added to cement-paste so made, the mass handles better, ("is less choppy,") molds better, makes a more perfect cast, and comes out of the molds smoother than when only cement, water, and sand are used, and the stones are less porous than when made in the usual way.

Four quarts of lime-powder to one bushel of cement is a proportion that meets all the requirements in the manufacture of our stone.

The combining-solvent is made by dissolving in four gallons of water, say, two pounds of sugar or sirup, or molasses, and two pounds of silicate of soda, or silicate of potash, or silicate of soda and potash, for Portland cements; four pounds of the silicate for common hydraulic cements; and four and one-fourth pounds for fat limes.

We call our stone "Prairie Granite."

We claim as our invention—

The plastic composition for producing artificial stone, consisting of hydraulic cement, lime-powder, sugar, silicate of soda, sand, and gravel, thoroughly mixed together before molding, substantially as specified.

FRANCIS W. COLBY.
EDWIN EVANS.

Witnesses:
SAM. J. JOHNSON,
A. OSBORN.